United States Patent [19]

Kawashima et al.

[11] Patent Number: 5,050,947
[45] Date of Patent: Sep. 24, 1991

[54] OPTICAL WAVEGUIDE CONTROL DEVICE EMPLOYING DIRECTIONAL COUPLER ON SUBSTRATE

[75] Inventors: Hisao Kawashima; Hiroshi Nishimoto, both of Tokyo, Japan

[73] Assignee: NEC Corporation, Tokyo, Japan

[21] Appl. No.: 555,014

[22] Filed: Jul. 20, 1990

[30] Foreign Application Priority Data

Jul. 20, 1989 [JP] Japan ............................. 1-186132
Aug. 25, 1989 [JP] Japan ............................. 1-219014

[51] Int. Cl.$^5$ ............................. G02F 1/01
[52] U.S. Cl. ............................. 385/9; 385/41
[58] Field of Search ............... 350/96.10, 96.12, 96.14

[56] References Cited

U.S. PATENT DOCUMENTS

| | | | |
|---|---|---|---|
| 4,763,974 | 8/1988 | Thaniyavarn | 350/96.14 |
| 4,820,009 | 4/1989 | Thaniyavarn | 350/96.14 X |
| 4,842,367 | 6/1989 | Djupsjöbacka | 350/96.14 |
| 4,877,299 | 10/1989 | Lorenzo et al. | 350/96.14 |
| 4,904,039 | 2/1990 | Soref | 350/96.14 |
| 4,932,736 | 6/1990 | Su | 350/96.14 |
| 4,940,305 | 7/1990 | Thaniyavarn | 350/96.14 |
| 4,950,042 | 8/1990 | Gaylor et al. | 350/96.14 |

Primary Examiner—John D. Lee
Assistant Examiner—Phan T. Heartney
Attorney, Agent, or Firm—Sughrue, Mion, Zinn, Macpeak & Seas

[57] ABSTRACT

An optical control device comprises optical waveguides provided on a substrate having an electrooptic effect, a buffer layer provided on the substrate to cover the optical waveguides, and control electrodes provided on the buffer layer for applying a predetermined voltage across the optical waveguides. The optical waveguides has a coupling portion, at which an interval of the optical waveguides is narrowed. In this optical control device, a distortion dispersing structure is provided in the vicinity of the control electrodes to disperse distortion locally accumulated in the vicinity of the control electrodes to the whole area of the substrate uniformly.

3 Claims, 8 Drawing Sheets

OPTICAL WAVEGUIDE CONTROL DEVICE EMPLOYING DIRECTIONAL COUPLER ON SUBSTRATE

FIELD OF THE INVENTION

This invention relates to an optical control device, and more particularly to, an optical control device having optical waveguides including a directional coupler provided on a substrate.

BACKGROUND OF THE INVENTION

The practical use of optical communication systems has been promoted these days. In this situation, highly advanced optical communication systems having, for instance, large capacity, multi-functions, etc. have been sought. In this tendency, the generation of light signals at a high speed, and the highly developed change-over and switching of light signals have been required to be proposed for a practical use.

In a conventional optical communication system, light signals are obtained by direct-modulating current injected into a semiconductor laser or a light emitting diode. However, this direct modulation is difficult to be realized at a speed higher than approximately 10 GHz due to the effect of relaxation oscillation, and to be applied to a coherent light transmission system due to the occurrence of wavelength fluctuation. For the purpose of overcoming these disadvantages, an external modulator has been used in an optical communication system. Especially, an optical modulator of a waveguide type having waveguides including a directional coupler provided on a substrate is advantageous in that it is of a compact, a high efficiency, and a high speed.

On the other hand, an optical switch has been used to change-over light transmission paths and to carry out the switching of light signals in a network system. A conventional optical switch is of a structure having a prism, a mirror, an optical fiber, etc. which are adapted to move mechanically. For this structure, the conventional optical switch is of a low speed, a low reliability, a large size, etc. so that it is difficult to be applied to an optical circuit of a matrix pattern. An optical switch which has been developed to overcome these disadvantages is also of a type having optical waveguides including a directional coupler to realize high speed operation, the integration of devices, high reliable operation, etc. Especially, an optical switch utilizing a ferroelectric material such as lithium niobate (LiNbO$_3$) crystal, etc. is advantageous in that light absorption is low to provide a low loss, and electro-optic effect is high to provide a high efficiency. As such an optical control device, a directional coupler type optical modulator/switch, a total reflection type optical switch, Mach-Zehnder type optical modulator, etc. have been conventionally reported. When this waveguide type optical control device is applied to a practically operated optical communication system, it is indispensable to provide the reproducibility of operative characteristics deeply connected to a high yield of devices along with basic performances such as low loss, high speed, etc.

On type of a conventional optical control device has first and second optical waveguides provided on a substrate of lithium niobate. The optical waveguides are partly narrowered in parallel interval to provide a directional coupler on the substrate. The directional coupler is covered with a buffer layer, on which first and second control electrodes are provided correspondingly to the first and second optical waveguides composing the directional coupler. Both ends of the first and second optical waveguides provide first and second light signal input terminals, and first and second light signal output terminals.

In operation, a light signal supplied to the first light signal input terminal is propagated through the first optical waveguide to be supplied to the directional coupler. When no voltage is applied across the first and second control electrodes, the light signal is completely coupled in the directional coupler to be transferred from the first optical waveguide to the second optical waveguide. Then, the light signal is propagated through the second optical waveguide to be supplied from the second light signal output terminal to a following stage. On the other hand, when a predetermined voltage is applied across the first and second control electrodes, the coupling between the first and second optical waveguides becomes lowered in the directional coupler. The details of the conventional optical control device will be explained in more detail later.

However, the conventional optical control device has a disadvantage in that the characteristics of the optical waveguides changes to change a coupling state of the directional coupler, because the optical waveguides are affected in the vicinity of the control electrodes by the fluctuation of a refractive index which occurs in the substrate of the ferroelectric crystal in accordance with the piezoelectricity and the optical elastic effect by distortion locally accumulated in the vicinity of the control electrodes. In fabricating the conventional optical control device, a control electrode film is grown on the buffer layer, and the control electrode film is etched to provide the control electrodes by use of a mask having a predetermined pattern. The control electrodes provides elastic discontinuity on the substrate, so that the local distortion occurs in the vicinity of the control electrodes on the substrate.

SUMMARY OF THE INVENTION

Accordingly, it is an object of the invention to provide an optical control device in which distortion occurring in the provision of control electrodes is uniformly dispersed.

It is another object of the invention to provide an optical control device in which a coupling state does not change in a directional coupler.

It is a further object of the invention to provide an optical control device having stable characteristics which is fabricated with a high yield.

According to this invention, an optical control device, comprises:

optical waveguides provided on a substrate having an electrooptic effect, the optical waveguides having a predetermined thickness extending from a surface of the substrate to a predetermined depth thereof;

a coupling portion provided on the substrate by narrowing an interval of the optical waveguides;

a buffer layer provided on the substrate to cover the optical waveguides including the coupling portion;

control electrodes for applying a predetermined voltage across the optical waveguides at the coupling portion, the control electrodes being provided on the buffer layer; and means for dispersing distortion locally accumulated in the vicinity of the control electrodes to the whole area of the substrate.

BRIEF DESCRIPTION OF THE DRAWINGS

This invention will be explained in more detail in conjunction with appended drawings, wherein.

DESCRIPTION OF THE PREFERRED EMBODIMENTS

Figure 1A:
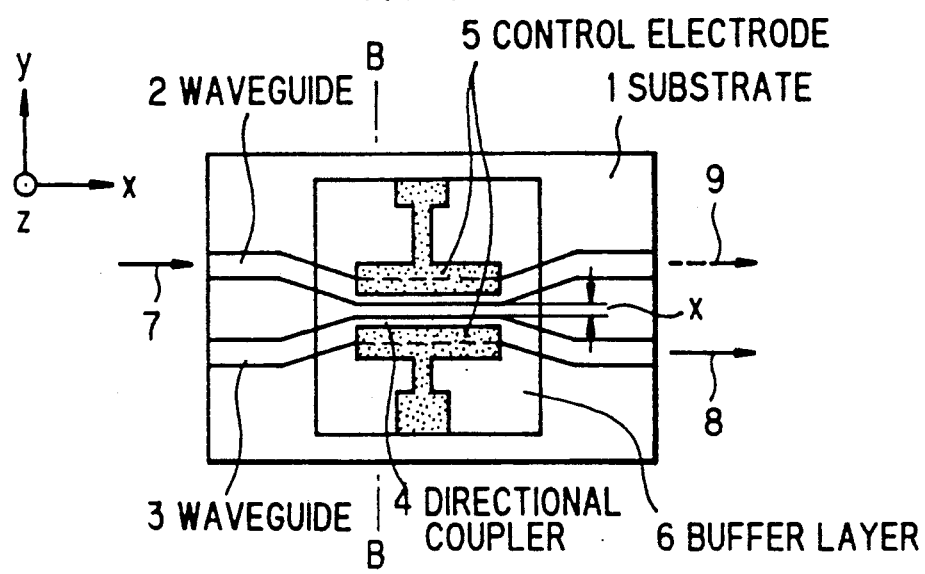
FIG. 1A is a plan view showing a conventional optical control device.

Before explaining an optical control device in the first preferred embodiment according to the invention, the aforementioned conventional optical control device will be explained in FIGS. 1A and 1B.

The optical control device comprises optical waveguides 2 and 3 provided on a substrate 1 of lithium niobate crystal which is cut vertically to Z-axis, and a directional coupler 4 provided on the substrate 1 by the optical waveguides 2 and 3 having a narrowed parallel interval X. The optical waveguides 2 and 3 are formed on the substrate 1 of lithium niobate crystal by diffusing Ti into portions of the substrate 1 corresponding to the optical waveguide pattern, so that the Ti-diffused portions become larger in refractive index than the substrate 1. The directional coupler 4 is defined to have the narrowed parallel interval X of several μm. The optical control device further comprises a buffer layer 6 provided on the substrate 1 to cover the optical waveguides 2 and 3, and control electrodes 5 provided on the buffer layer 6. The buffer layer 6 avoids light propagating through the optical waveguides 2 and 3 to be absorbed by the control electrodes 5.

In operation, an input light 7 is supplied to an input terminal of the optical waveguide 2 to be propagated through the optical waveguide 2. When the propagated light reaches the directional coupler 4, it is gradually transferred in the directional coupler 4 to the optical waveguide 3 in a state that no voltage is applied across the control electrodes 5, so that the light is completely transferred at output terminals of the directional coupler 4. As a result, an output light 8 is obtained at an output terminal of the optical waveguide 3. On the other hand, when a predetermined voltage is applied across the control electrodes 5, a refractive index of the optical waveguides 2 and 3 changes below the control electrodes 5, so that phase mismatch occurs between waveguided modes of lights propagating through the optical waveguides 2 and 3. As a result, a coupling state changes between the optical waveguides 2 and 3 of the directional coupler 4. Consequently, an output light 9 is obtained at an output terminal of the optical waveguide 2.

In fabricating the optical control device, a control electrode film is grown on the buffer layer 6. Then, the film is etched except for portions of the control electrodes 5 by photolithography. As a result, the above described control electrodes 5 are obtained on the buffer layer 6.

In this fabricating process, it is known that distortion occurs in the substrate 1 due to the difference of thermal expansion coefficients of the substrate 1, the buffer layer 6, and the control electrodes 5, and the difference of elastic coefficients such as poisson ratios, etc. thereof, when films of the buffer layer 6 and the control electrodes 5 are grown, respectively. In this state, generally, the distortion which has occurred at the grown times of the films is distributed into the entire area of the substrate crystal, so that the difference of refractive indexes does not change between the optical waveguides 2 and 3 and the substrate 1, even if absolute values of the refractive indexes change before and after the growing of the films. Accordingly, optical waveguide characteristics which have been obtained at the grown time of the optical waveguides 2 and 3 is maintained, so that no change occurs in a coupling state of the directional coupler 4.

However, distortion which fluctuates at a time of forming the control electrodes 5 is locally accumulated in the vicinity of the control electrodes 5, because the control electrodes 5 which are formed by etching the control electrode film provide elastic discontinuity on the substrate. As a result of this distortion, the change of a refractive index occurs in the ferroelectric crystal substrate 1 in accordance with piezoelectricity, optical elastic effect, etc. Consequently, the optical waveguides 2 and 3 are affected in the vicinity of the control electrodes 5 by the fluctuation of the refractive index, thereby changing the optical waveguide characteristics. As a result, the coupling state of the directional coupler 4 changes to result in the decrease of reproducibility in providing a coupling state of the directional coupler 4 as designed. The change amount of the coupling state changes in each batch of the grown films for the buffer layer 6 and the control electrodes 5. These are the aforementioned disadvantages of the conventional optical control device.

Figure 1B:
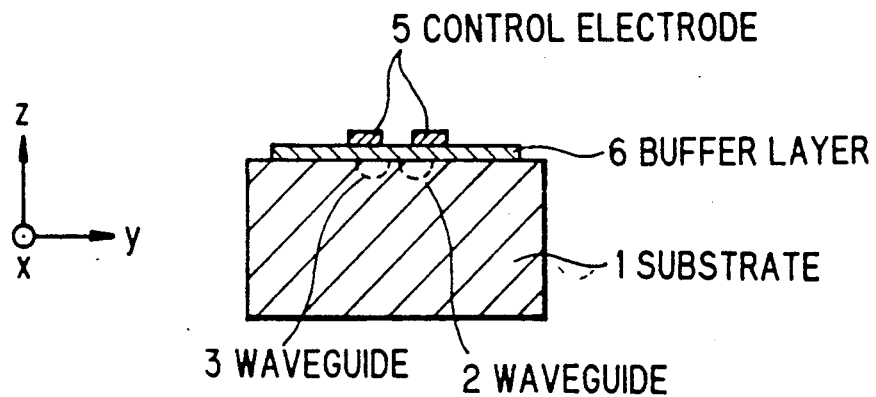
FIG. 1B is a cross sectional view along a line B—B in FIG. 1A.
Figure 2A:
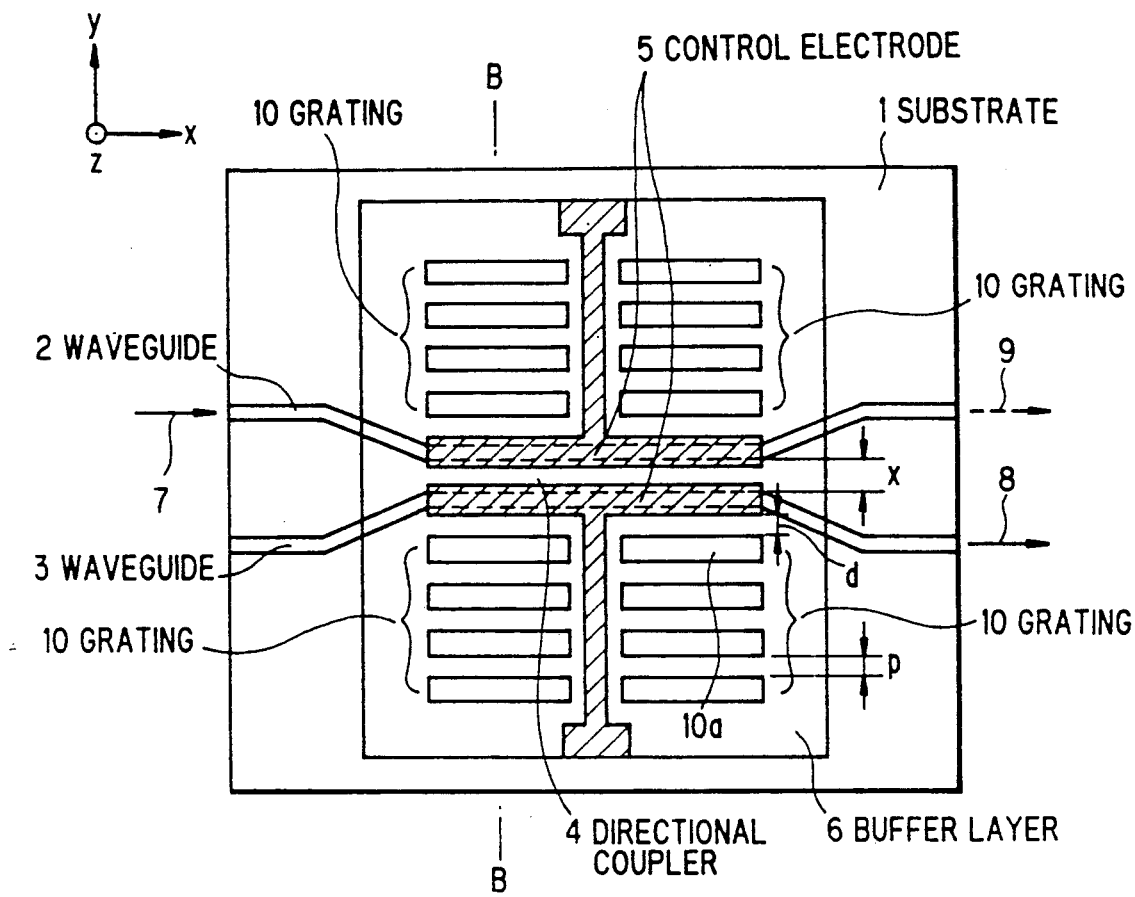
FIG. 2A is a plan view showing an optical control device in a first preferred embodiment according to the invention.
Figure 2B:
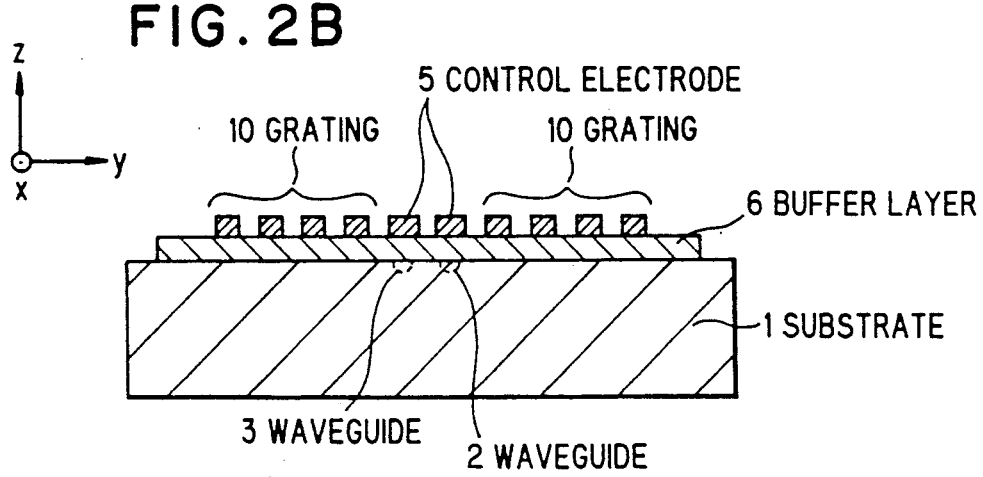
FIG. 2B is a cross sectional view along a line B—B in FIG. 2A.

FIGS. 2A and 2B show an optical control device in the first preferred embodiment according to the invention, wherein like parts are indicated by like reference numerals as used in FIGS. 1A and 1B. The optical control device comprises optical waveguides 2 and 3 provided on a substrate 1 of lithium niobate ($LiNbO_3$) crystal which is cut vertically to Z-axis, and a directional coupler 4 provided on the substrate 1 by the optical waveguides 2 and 3 having a narrowed parallel interval X of approximately several μm. The optical waveguides 2 and 3 are formed on the substrate 1 of lithium niobate crystal by diffusing Ti into portions of the substrate 1 corresponding to the optical waveguide pattern, so that the Ti-diffused portions are larger in refractive index than the substrate 1. The diffusion of Ti is carried out at a temperature of approximately 900° to 1100° C. for several hours to provide the optical waveguides having a depth of approximately 3 to 10 μm. In addition, the optical control device comprises a buffer layer 6 of $SiO_2$ which is optically transparent and lower in refractive index than the substrate 1, and control electrodes 5 having two metal layers of Cr and Au provided on the buffer layer 6. In this structure, the absorption of light is avoided from the optical waveguides 2 and 3 to the control electrodes 5 by the buffer layer 6. The optical control device further comprises four groups of gratings 20 in the vicinity of and parallel to the control electrodes 5 provided on the buffer layer 6. Each of the gratings 10 is of the same material as the control electrodes 5, and includes plural grating elements 10a having the same length and width as each other and arranged to be parallel with a pitch of 40 to 60 μm. A grating element 10a which is positioned in the nearest vicinity of a corresponding one of the control electrodes 5 has a distance d from the corresponding control electrode 5.

In fabricating the optical control device, the gratings 10 are formed simultaneously with or prior to the formation of the control electrodes 5 by etching a control electrode film grown on the buffer layer 6. In other words, the control electrode film is removed by a pattern excepting the control electrodes 5 and the gratings 10. In this stage, if the control electrodes 5 are formed prior to the formation of the gratings 10, distortion which has occurred in elastic discontinuity region due to the formation of the control electrodes 5 remains even after the formation of the gratings 10. The gratings 10 may have a pitch which is increased, as the distance is increased from the corresponding control electrode 5, instead of the aforementioned constant pitch, and the width of the grating elements 10a is not always required to be constant, and parallel, but slant to some extent. Even more, the gratings 10 are preferable to be connected to the ground, so that the accumulation of charge is avoided in the buffer layer 6. In the modification of the stripe gratings 10, square shaped protrusions each having a side of approximately 40 μm and of the same material as the control electrodes 5 may be provided on the buffer layer 6 to be arranged vertically and horizontally to the control electrodes 5 in a periodical pattern having the same pitch. In short, when small protrusions are formed around the control electrodes 5 prior to or simultaneously with the formation of the control electrodes 5, distortion which has occurred in the substrate 1 is uniformly dispersed into elastic discontinuity points.

Figure 3:
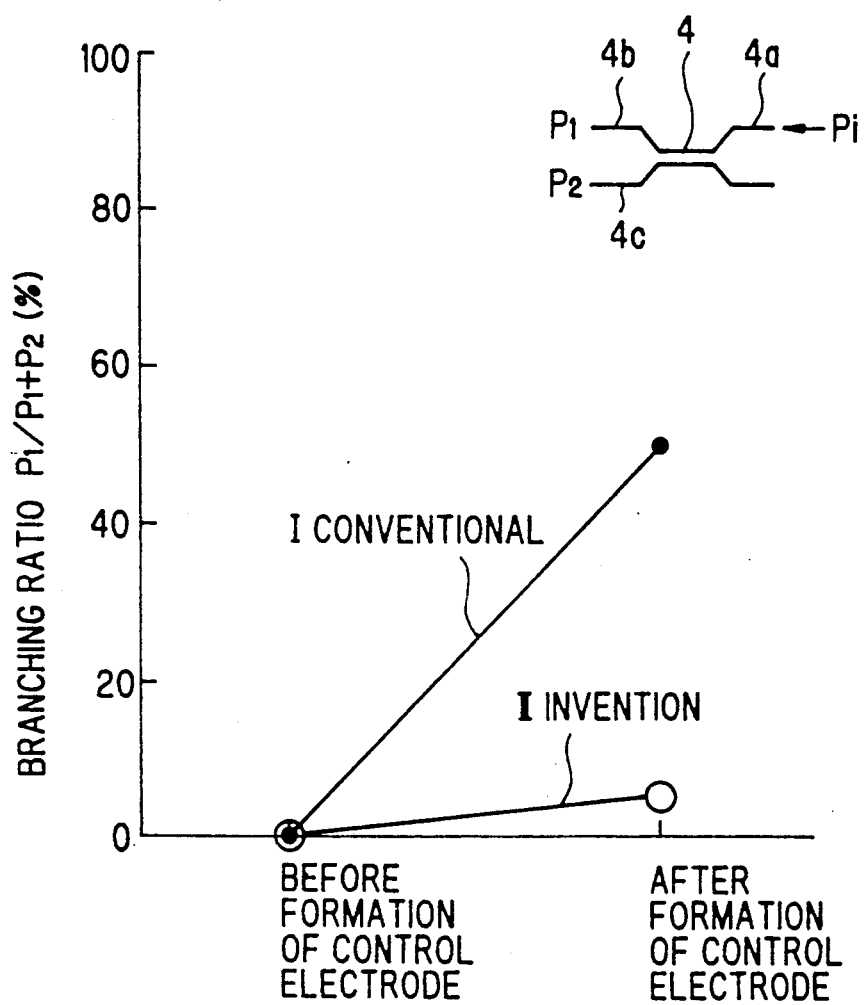
FIG. 3 is a graph showing the change of branching ratios before and after the formation of control electrodes the first preferred embodiment.

FIG. 3 shows the difference in coupling states of the directional couplers 4 between the conventional optical control device and the optical control device in the first preferred embodiment. The coupling state is determined in accordance with a branching ratio which is defined by $P_1/P_i$, where $P_i$ is an input light power supplied to an input terminal 4a of the directional coupler 4, and $P_1$ and $P_2$ are output light powers supplied from output terminals 4b and 4c of the directional coupler 4 ($P_i = P_1 + P_2$), as shown in FIG. 3. In this experiment, light of TE mode is used. The branching ratio $P_1/P_i$ changes before (without) and after (with) the formation of the control electrodes 5. In FIG. 3, a line I indicates the change in the conventional optical control device, and a line II indicates the change in the optical control device in the preferred embodiment. As apparent from the comparison between the lines I and II, the change of the branching ratio $P_1/P_i$ is substantially negligible in the present invention, so that light of approximately 100% is transferred from one optical waveguide to the other optical waveguide, while the change of the branching ratio $P_1/P_i$ is approximately 50%, so that light of approximately 50% is not transferred from one optical waveguide to the other optical waveguide to provide light of 50% which is only propagated through one optical waveguide in the conventional optical control device.

Figure 4A:
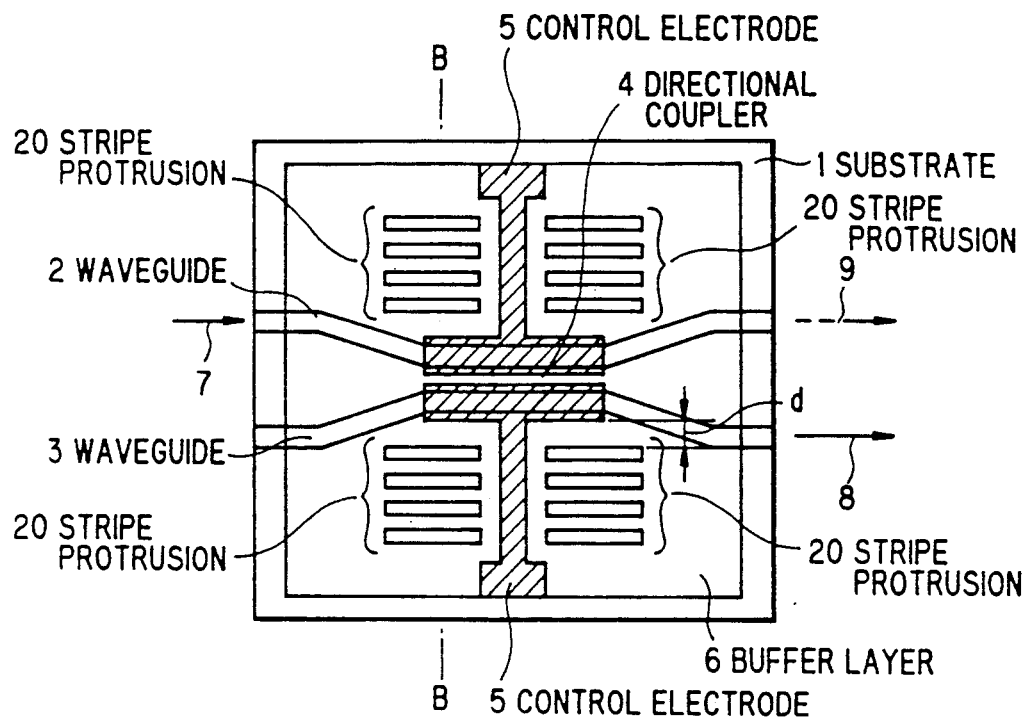
FIG. 4A is a plan view showing an optical control device in a second preferred embodiment according to the invention, FIGS. 4B a cross sectional view along a line B—B in FIG. 4A.
Figure 4B:
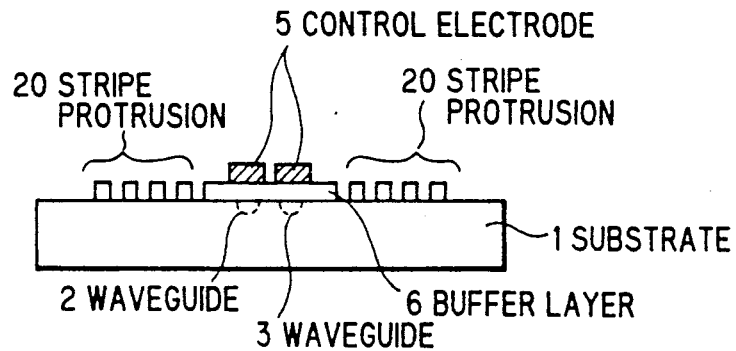

FIGS. 4A and 4B show an optical control device in the second preferred embodiment according to the invention, wherein like parts are indicated by like reference numerals as used in FIGS. 2A and 2B. This optical control device is characterized by the provision of periodical stripe protrusions 20 which are parallel to control electrodes 5 on a substrate 1. A protrusion 20 which is in the nearest vicinity of a corresponding control electrode 5 in each of the four group protrusions 20 is positioned to have a distance d of 5 to 500 μm. A ratio of a pitch and a width of the protrusions 20 is not limited to be a specified value, but may be an adequate value such as 1. In the second preferred embodiment, it is important that the protrusions 20 are formed prior to the formation of the control electrodes 5.

Figure 5:
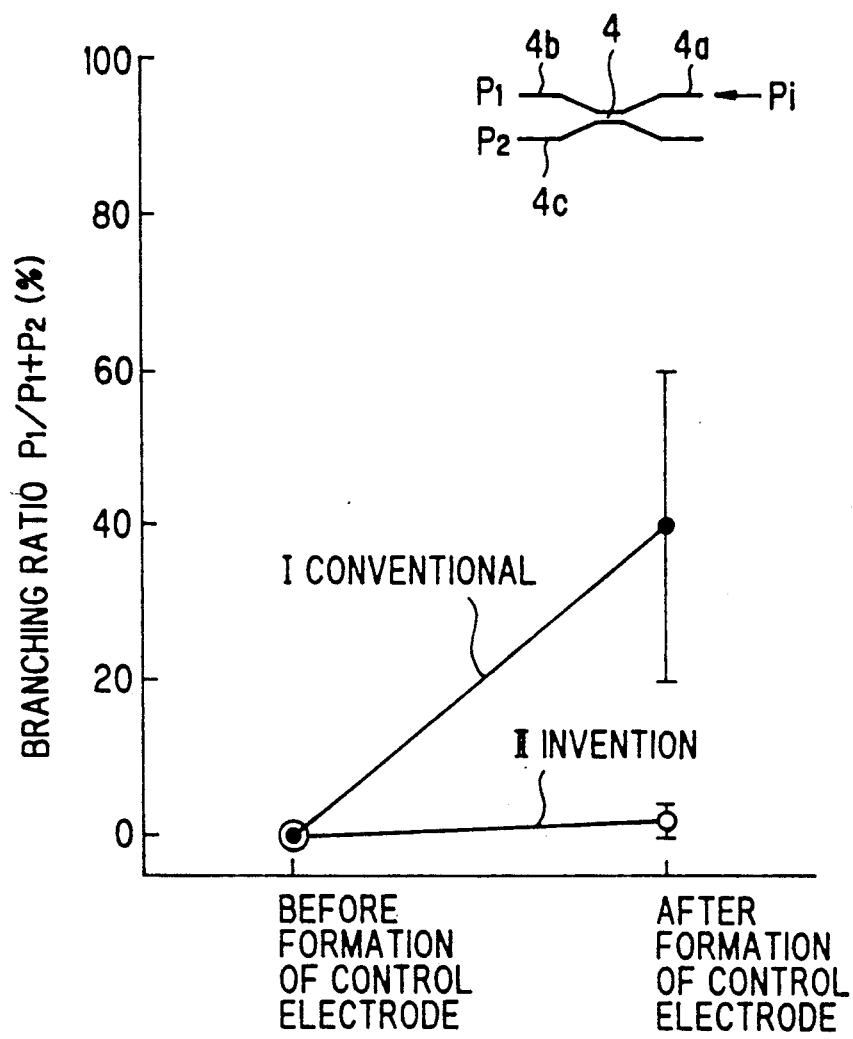
FIG. 5 is a graph showing the change of branching ratios before and after the formation of control in t second preferred embodiment.

FIG. 5 shows branching ratios $P_1/P_i$ of the conventional optical control device and the optical control device in the second preferred embodiment. As apparent from the comparison between lines I and II indicating the branching ratios $P_1/P_i$ of the conventional optical control device and the present invention, respectively, a change of the branching ratio $P_1/P_i$ before and after the formation of control electrodes 5 is negligible in the invention, while that of the conventional optical control device ranges 20 to 60%.

The periodical protrusions 20 are formed by the steps of growing a film for a buffer layer 6 on the substrate 1, forming a periodical mask pattern corresponding to the periodical protrusions 20 on the film by photolithography, and etching the film to provide the periodical protrusions 20 and the buffer layer 6 by use of dry etching method such as ion beam, reactive ion, and reactive ion beam etchings, or wet etching method utilizing etchant. The periodical protrusions 20 may be formed by use of focused ion beam etching method, so that the step of using photolithography is not necessary. The buffer layer 6 is formed to be lower in refractive index than the substrate 1 of lithium niobate by $SiO_2$, SiON, $MgF_2$, $Si_3N_4$, $Al_2O_3$, etc., and of less light absorption property.

Figure 6A:
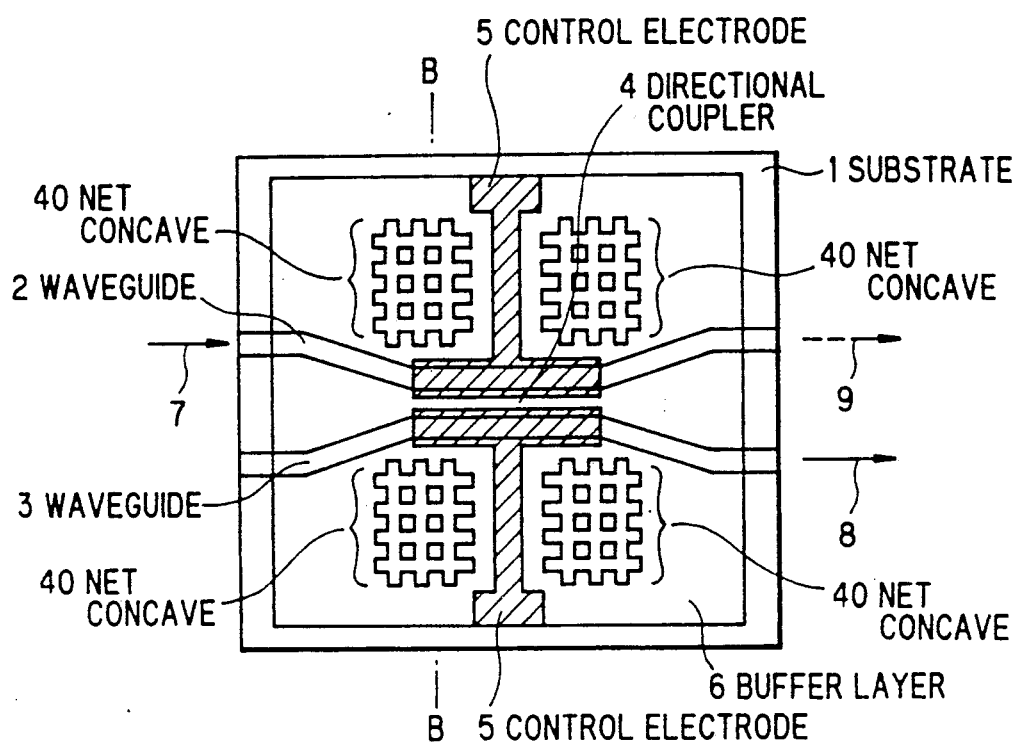
FIG. 6A, 7A, and 8A are plan views showing optical control devices in third to fifth preferred embodiments according to the invention, respectively.
Figure 6B:
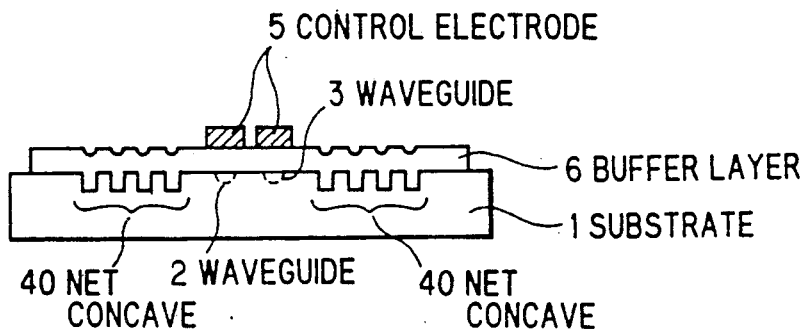
FIG. 6B, 7B, and 8B are cross sectional views along lines B—B FIGS. 6A, 7A and 8A, respectively.

FIGS. 6A and 6B show an optical control device in the third preferred embodiment according to the invention, wherein like parts are indicated by like reference numerals as used in FIGS. 4A and 4B. In this third preferred embodiment, four groups of periodical net shaped concaves 40 are provided on a buffer layer 6 and at the surface of the substrate 1 prior to the formation of control electrodes 5 in place of the protrusions 20 in the second preferred embodiment. In the third preferred embodiment, the same result is obtained in regard to the change of a branching ratio as in the second preferred embodiment.

Figure 7A:
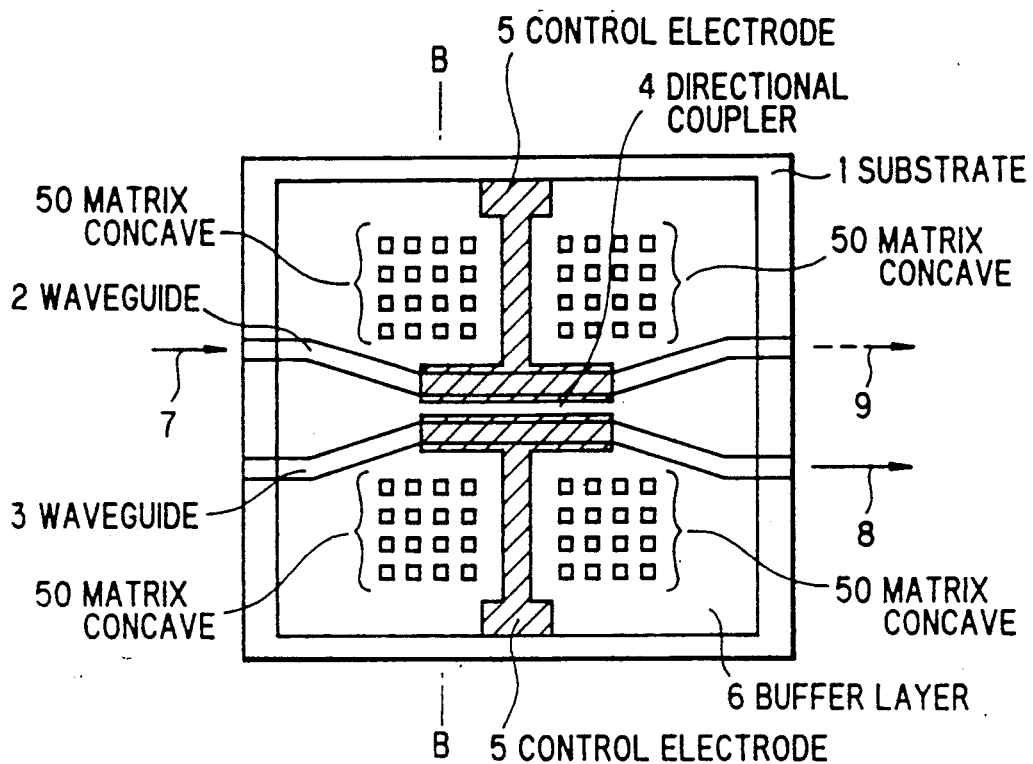
Figure 7B:
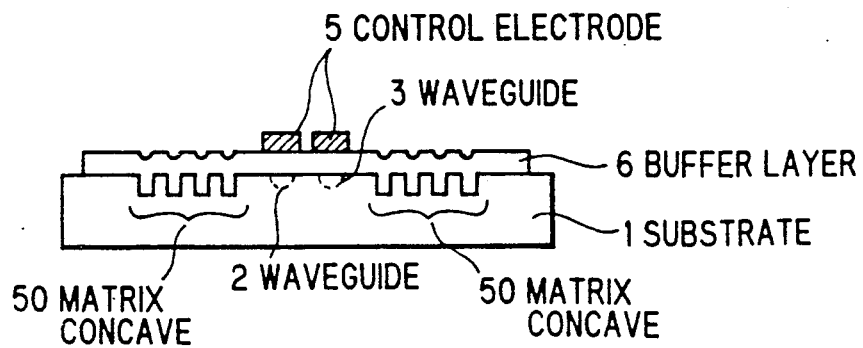

FIGS. 7A and 7B show an optical control device in the fourth preferred embodiment according to the invention, wherein like parts are indicated by like reference numerals as used in FIGS. 4A and 4B. In this fourth preferred embodiment, four groups of periodical matrix shaped concaves 50 are provided on a buffer layer 6 and at the surface of the substrate 1 prior to the formation of control electrodes 5 in place of the protrusions 20 in the second preferred embodiment. In the fourth preferred embodiment, the same result is obtained in regard to the change of a branching ratio as in the second preferred embodiment.

Figure 8A:
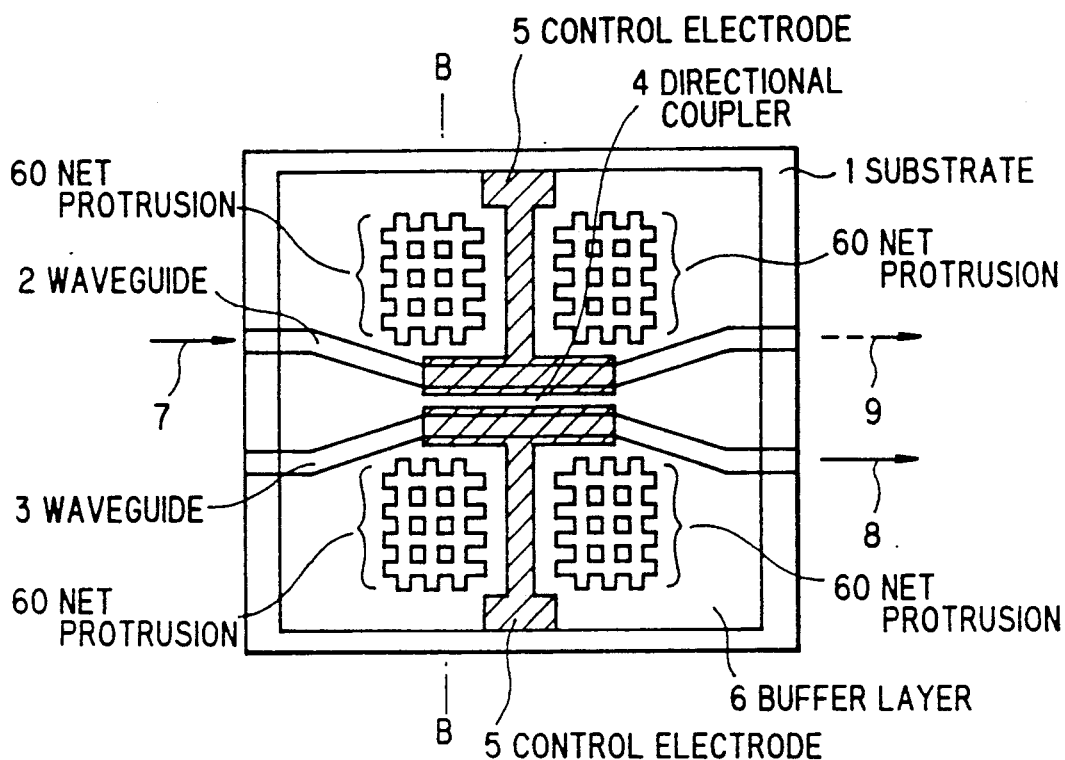
Figure 8B:
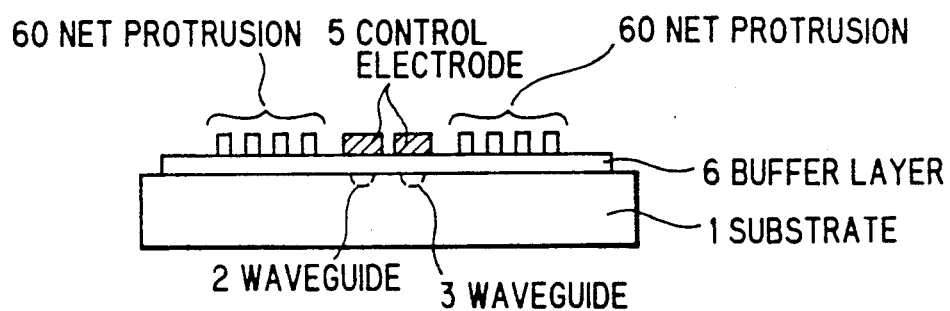

FIGS. 8A and 8B show an optical control device in the fifth preferred embodiment according to the invention, wherein like parts are indicated by like reference numerals as used in FIGS. 2A and 2B. In this fifth preferred embodiment, four groups of periodical net shaped protrusions 60 of the same material as a buffer layer 6 are provided on the buffer layer 6 prior to the formation of the control electrodes 5 in place of the gratings 10 in the first preferred embodiment. In the fifth preferred embodiment, the same result is obtained in regard to the change of a branching ratio as in the second preferred embodiment.

In the fifth preferred embodiment, the net shaped protrusions 60 may be provided by the same material as control electrodes 5. In such a case, a control electrode film is grown on the buffer layer 6, and a mask pattern corresponding to the net shaped protrusions 60 and the control electrodes 5 is provided on the control electrode film by lithography. Then, the control electrode film is etched to be removed by use of dry etching method such as ion beam etching, reactive ion etching, reactive ion beam etching, etc. or chemical wet etching method utilizing etchant. The control electrodes 5 and the net shaped protrusions 60 may be directly drawn on the buffer layer 6 by use of focused ion beam etching method. The net shaped protrusions 60 may be provided on the buffer layer 6 by a material different from the control electrodes 5. In such a case, a metal film or an insulating material film is provided on the buffer layer, before the control electrodes 5 are provided on the buffer layer 6. The film is etched to be removed, thereby providing a net shaped protrusions of the metal or the insulating material by use of the above described etching method.

As fully explained above, periodical stripe, net shaped, or matrix shaped gratings, concaves or protrusions are provided on a buffer layer, or a substrate in the invention. According to an experiment conducted by the inventors, it is confirmed that the change of a coupling state of a directional coupler which occurs by the formation of control electrodes is suppressed by providing the gratings, concaves, or protrusions in the vicinity of the control electrodes. It is generally known that distortion tends to be accumulated in elastic discontinuity regions of a substrate. Before providing control electrodes on the buffer layer, the distortion is uniformly distributed to keep a balance in the substrate. Then, when the control electrode is provided on the buffer laye: by etching a control electrode film, the balance of the distortion is no longer maintained to be shifted to a second balance state. In this state, the distortion is converged into the elastic discontinuity regions, if the regions exist in the substrate. As described before, only control electrodes exist on the substrate as elastic discontinuity regions which are produced by the formation of the control electrodes. When the distortion is shifted to the second balance state of distortion, therefore, the distortion is conveyed in the vicinity of the control electrodes, so that a coupling state of a directional coupler changes largely. This is a disadvantage of the conventional optical control device. On the other hand, a number of elastic discontinuity regions are formed on the substrate in the invention. For this reason, the distortion disperses to the elastic discontinuity regions thus formed on the substrate to provide a balance state, when the control electrodes are provided. In other words, distortion to be accumulated in the vicinity of the control electrodes is much decreased as compared to the conventional optical control device. This suppresses the change of a refractive index of a ferroelectric crystal in the vicinity of optical waveguides provided thereon. Accordingly, optical waveguide characteristics which are determined at the time of forming the optical waveguides on the ferroelectric crystal substrate are maintained to provide no change of a coupling state of the directional coupler. Thus, an optical control device according to the invention has predetermined characteristics as designed, and is stably fabricated with a high yield.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

We claim:

1. An optical control device, comprising:
   optical waveguides provided on a substrate having an electrooptic effect, said optical waveguides having a predetermined thickness extending from a surface of said substrate to a predetermined depth thereof;
   a coupling portion provided on said substrate by narrowing an interval of said optical waveguides;
   a buffer layer provided on said substrate to cover said optical waveguides including said coupling portion;
   control electrodes for applying a predetermined voltage across said optical waveguides at said coupling portion, said control electrodes being provided on said buffer layer; and
   protrusion and concave means for dispersing distortion locally accumulated in the vicinity of said control electrodes to the whole area of said substrate, said protrusion and concave means being formed on one of surfaces of said substrate and said buffer layer.

2. An optical control device, according to claim 1, wherein:
   said protrusion and concave from periodical stripe shaped protrusions, periodical net shaped concaves, periodical matrix shaped concaves, and periodical net shaped protrusions, a material of said structure being the same as that of said control electrodes.

3. An optical control device, according to claim 1, wherein:
   said protrusion and concave means is a structure selected from periodical stripe shaped protrusions, periodical net shaped concaves, periodical matrix shaped concaves, and periodical net shaped protrusions, a material of said structure being the same as that of said buffer layer.

* * * * *

UNITED STATES PATENT AND TRADEMARK OFFICE
CERTIFICATE OF CORRECTION

PATENT NO. : 5,050,947

DATED : September 24, 1991

INVENTOR(S) : Kawashima et al.

It is certified that error appears in the above-identified patent and that said Letters Patent is hereby corrected as shown below:

Col. 1, line 62, delete "On" insert --One--.

Col. 3, line 23, delete "t" insert --the--

Col. 6, line 3, delete "approximatelY" insert --approximately--

Col. 7, line 52, delete "laye:" insert --layer--

Signed and Sealed this

Twenty-third Day of February, 1993

Attest:

STEPHEN G. KUNIN

Attesting Officer

Acting Commissioner of Patents and Trademarks